Figure 1:
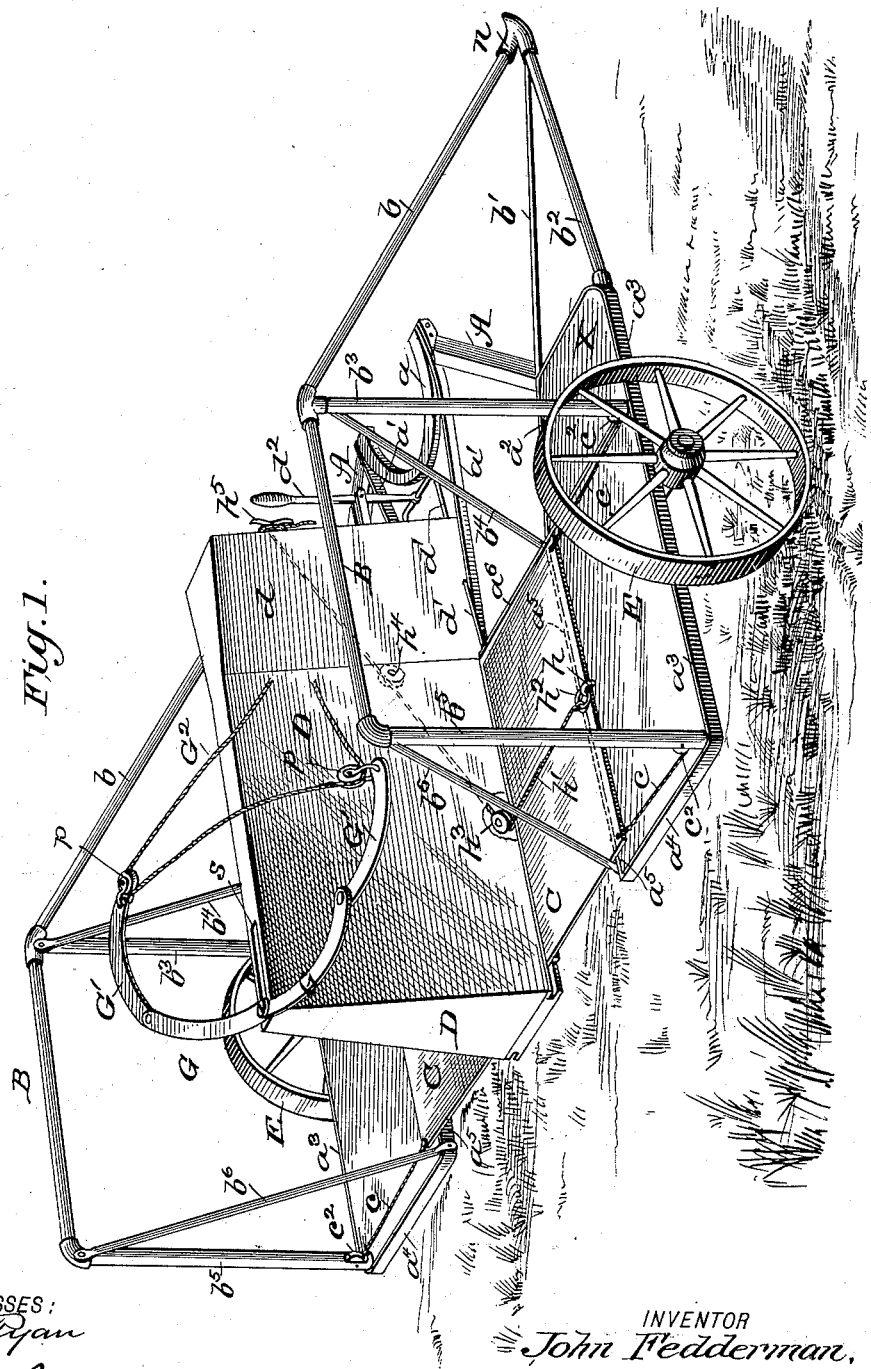

No. 653,081. Patented July 3, 1900.
J. FEDDERMAN.
CORN HARVESTER AND SHOCKER.
(Application filed Sept. 6, 1899.)

(No Model.) 2 Sheets—Sheet 1.

WITNESSES:
Jos. A. Ryan
Edw. W. Byrn

INVENTOR
John Fedderman,
BY
ATTORNEYS

No. 653,081. Patented July 3, 1900.
J. FEDDERMAN.
CORN HARVESTER AND SHOCKER.
(Application filed Sept. 6, 1899.)
(No Model.) 2 Sheets—Sheet 2.
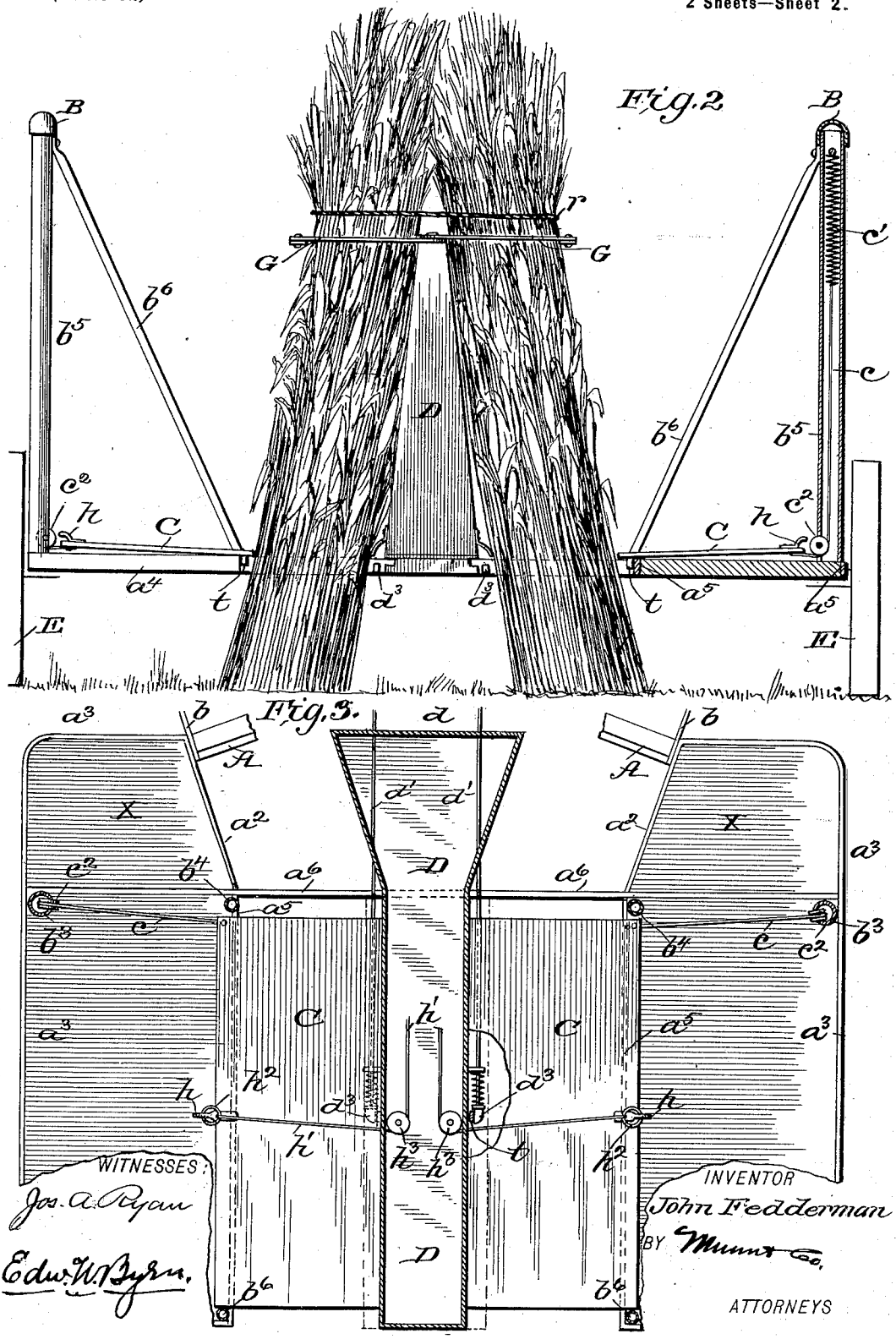

UNITED STATES PATENT OFFICE.

JOHN FEDDERMAN, OF HARRISBURG, PENNSYLVANIA.

CORN HARVESTER AND SHOCKER.

SPECIFICATION forming part of Letters Patent No. 653,081, dated July 3, 1900.

Application filed September 6, 1899. Serial No. 729,619. (No model.)

*To all whom it may concern:*

Be it known that I, JOHN FEDDERMAN, of Harrisburg, in the county of Dauphin and State of Pennsylvania, have invented a new and useful Improvement in Corn Harvesters and Shockers, of which the following is a specification.

The object of my invention is to provide a corn-harvester of simple construction and practical operation which permits two rows of corn to be expeditiously cut, gathered into a shock, and then dropped in vertical position and bound before being released from the machine.

My invention employs the well-known arrangement of inclined knives for cutting the stalks.

The leading feature of novelty is to be found in the means for supporting the stalks of corn while being gathered into a shock and the means for dropping said bundle and holding it within the machine in vertical position, but resting on the ground, while being bound into a shock, as will be hereinafter more fully described.

Figure 1 is a perspective view of the entire machine. Fig. 2 is a rear elevation, partly in section; and Fig. 3 is a sectional plan view.

The machine is symmetrically constructed of two exactly-corresponding halves, one half intended for cutting one row of corn and the other half for the other, while the team walks between the rows. As the two halves of the machine are duplicates, it will only be necessary to describe one portion of the same.

A designates the knives, having a sharpened forward edge and held in inclined position to the line of advance by being rigidly fastened to the horizontal portion of the framework. This framework consists of a rectangular frame composed of side bars $a^3$, short end bars $a^4$, inner side bars $a^5$, and long front cross-bar $a^6$, which extends from the outer side bar $a^3$ of one half of the machine to the corresponding bar of the other half. To the forward end of each knife there is a brace $a'$, extending to the cross-bar $a^6$, and a semicircular or fifth-wheel bar $a$ is also connected to these parts and is intended to be mounted upon or attached to a truck or caster-wheel in front, (not shown,) to which the draft attachments are connected in the usual way. The rear end of each knife is connected to a brace $a^2$, extending to cross-bar $a^6$ and also to the in-turned end of side bar $a^3$. The rectangular frames, composed of bars $a^3$ $a^4$ $a^5$ $a^6$, are supported by running-wheels E, and on these frames are erected a braced guard-rail B, having braced legs $b^3$ $b^4$ in front and $b^5$ $b^6$ in the rear. Three converging bars $b$ $b'$ $b^2$ extend to a nose $n$ in front, which form a guide to direct the stalks of corn onto the knife. The brace $b$ is a downward extension of rail B, and $b'$ $b^2$ are forward extensions of the horizontal frame.

In middle position between the two halves of the machine is a hollow wall D, of sheet metal, wider at its base than it is at the top and diverging at its forward end $d$. This wall is also a little wider at the forward end of its bottom part than it is at the rear end of its bottom part, so that the cornstalks may have clearance in passing out to the rear, as hereinafter more fully explained.

Between the middle longitudinal wall D and the inner side rail $a^5$ there is on each side a space closed on both sides and in front, but open to the rear, in which is disposed a horizontal shelf C, whose function is to form a support for the butt-ends of the stalks as they are cut and gathered thereon into a shock and then by a quick lateral movement to pass from beneath the stalks and allow them to rest upon the ground while being bound, as shown in Fig. 2, the machine being held stationary during this operation, and after which when the machine is started forward again the bundle or shock passes out to the rear of the open space, or rather the bundle or shock remains standing, while the machine moves away from it.

The shelves C travel on suitable guides on a floor within the bars $a^4$ $a^6$ and are drawn from beneath the cut corn by springs as follows: To the outer ends of the shelf are attached two cords or chains $c$ $c$, which pass around pulleys $c^2$ $c^2$ at the base of the legs $b^3$ $b^5$, which are made hollow and in which are secured coiled springs $c'$, which connect with cords $c$, and when the shelves are extended, as in Figs. 1 and 3, are under tension and when the shelves are unlocked rapidly draw the shelves C away from the middle wall D, leaving an open space between the same and the inner side bar $a^5$, as seen in Fig. 2.

When the shelf C is drawn across to the middle wall D, it is caught and locked there, so as to hold the springs under tension by a spring-bolt $d^3$ along the wall D, which has a rod $d'$ running forward to a lever $d^2$, which works two such bolts or which may be duplicated, if desired. The bolt $d^3$ engages a catch $t$ on the under side of the shelf C near its edge. To draw the shelf across to the wall D in setting the shelf, considerable force is required. A hook $h$ is constructed on the outer edge of the shelf, and a cord $h'$, (see Fig. 1,) with an eye $h^2$, is arranged within the hollow wall D and runs over pulleys $h^3$ $h^4$ and is wound upon a cleat $h^5$. When the shelf is to be drawn out against the tension of the springs, the eye in the cord is fastened over the hook of the shelf, and power is then applied to the other end of the cord until the shelf is drawn across and locked by the spring-bolt. The cord is then disconnected from the hook, so as to be out of the way of stalks of corn, and is drawn into the hollow wall.

On the upper rear end of the middle wall D there are pivoted two hinged arms G, either curved or straight and having jointed sections G' and having their ends connected by pulleys $p$ and a cord $G^2$, by which they may be made to embrace the standing shock of stalks on both sides of the wall D at a point above the top of the same to compress them preparatory to binding. These arms have their pivot arranged in a slot $s$ in the top of wall D, so as to allow the arms to move forward a little to better embrace the shock.

The operation of my machine is as follows: X X are platforms, on each of which is stationed a workman. As the machine is drawn across the field the stalk-supporting shelves C are adjusted close to the middle wall D, and as the stalks are cut by the knife A they are gathered in the arms of the attendant on each side and are leaned in nearly-vertical position against the wall D and arms G G'. The inclination of the sides of the wall D prevents the stalks from toppling over while they are being accumulated. When sufficient have accumulated to form a shock, the machine is brought to a standstill and the accumulated stalks are dropped to the ground by working lever $d^2$, and while standing on the ground and still within the inclosure of the machine they are compressed by arms G G' and cord $G^2$ and bound into a single shock by a cord $r$. The machine is then driven forward and the shock, of generally square pyramidal shape, is left standing upright in the field. It will thus be seen that the hollow wall D forms a sort of core or former, which is pulled out from between the two halves of the shock when the machine is started forward.

With regard to the constricting-arms G G' it will be seen that they are independently pivoted on the same center at the rear upper end of the middle wall, and their free ends extend forwardly around the shock to hold the stalks loosely before being dropped and bound. When said stalks are dropped, the arms are constricted and the shock bound, the permanent binding-cord $r$ being arranged above the constricting-arms, as seen in Fig. 2, and when the cord $G^2$ is released and the machine driven ahead the independent folding arms turn backwardly in opposite directions to the rear and coming together behind their central point are dragged trailing through the space between the two halves of the shock and below the permanent binding-cord $r$.

I am aware that corn-harvesting machines have been heretofore devised in which the cut stalks were sustained in vertical position upon subjacent shelves or supports on opposite sides of a central former, which supports after the shocks were bound were withdrawn from beneath the bound shock to deposit the latter upon the ground. My invention is distinctive in the fact that it does not bind the shock on the machine, but the shock is not bound until it is deposited on the ground in the situation in which it permanently remains as a shock and is undisturbed and not moved in any way after it is thus bound. For this purpose the former D is made lower than the side rails B, and the horizontal compression-arms G G', mounted on the former, are brought low enough so that when the stalks are deposited on the ground said arms will clasp the stalks low enough down to properly compress the shock and leave room enough above them for the binding-cord. Binding the shock on the ground after dropping also presents the advantage that the shock does not wedge downwardly upon the former and hang on the same as it does when first bound above the former and then dropped. Another important distinction is to be found in the means for removing with positiveness and certainty the supporting-shelves from beneath the butt-ends of the stalks. As will be readily understood, these stalks are quite heavy, and their butt-ends scrape on the shelves with considerable friction, and to avoid scattering or spreading apart the lower ends of the stalks by the movement of the supporting-shelves it is necessary that they should have a quick, energetic, and certain action, which takes advantage of the inertia of the mass of stalks to prevent scattering them. In my invention the strong springs which accomplish this result are under a maximum tension when the shelves are in their supporting position, and when the latter are released they move more quickly and strongly in response to this tension under the superincumbent mass of stalks without scattering the same. This is of the greatest importance in my form of harvester, in which the stalks are dropped before being bound into a shock. Another important distinction is that the pivotal center of the flexible binding-arms G G' advances or slides in the slot $s$, which insures compressing the shock centrally about its true vertical axis instead of drawing the top to the rear. This makes the rear of the shock inclined and braced, as well as the front and sides, and causes it to be well braced and self-sustaining as against wind in all directions.

Having thus described my invention, what I claim as new, and desire to secure by Letters Patent, is—

1. A corn-harvester having a central wall or former, sliding shelves for supporting the gathered corn in two bunches, means for withdrawing said shelves, horizontal constricting-arms pivoted upon the extreme upper edge of the central wall or former, and having their outer ends connected by a rope, whereby the stalks are loosely inclosed and held while being dropped and before being bound, and the permanent binding-cord may be next applied to the shock above the constricting-arms, with the stalks on the ground, and the constricting-arms are then drawn through the middle of the shock below the permanent binding-cord, substantially as described.

2. A corn-harvester having a central wall or former, sliding shelves for supporting the gathered corn in two bunches, means for withdrawing said shelves, horizontal constricting-arms pivoted at their rear ends to the former to have an independent swing from a position having their free ends in front to a position having their free ends in the rear, so as to be drawn through the space between the two halves of the shock and below the permanent binding-cord, and an adjustable cord connecting the free ends of the constricting-arms, substantially as described.

3. A corn-harvester having a central wall or former, sliding shelves for supporting the gathered corn in two bunches, means for withdrawing said shelves, horizontal constricting-arms pivoted to the rear upper end of the central wall or former, upon the same axis, and each having an independent range of movement from a position with their free ends forward to a position with their free ends to the rear, said arms having each a joint intermediate of their lengths, and a cord connecting their free ends substantially as and for the purpose described.

4. A corn-harvester having a central core or former about which the two halves of a shock are formed, and pivoted compressing devices mounted upon said core or former and having thereon a sliding motion substantially as and for the purpose described.

5. In a corn-harvester, the combination of a frame having an opening with a rear outlet, a removable shelf forming a temporary floor to said opening, an upright guard-rail arranged on the outer side thereof and having hollow posts or legs, coil-springs arranged in said legs and connected to the shelf, and means for locking the shelf in the opposite position from that in which it is drawn by the springs substantially as described.

6. In a corn-harvester, the combination of a horizontal frame having two openings each with an outlet to the rear, removable shelves arranged above said openings, a middle wall between them with inclined sides, and a pair of horizontally-swinging binding-arms hinged to the upper rear end of said wall each arm being made flexible and said arms having their outer ends connected by cords, substantially as and for the purpose described.

In testimony whereof I have signed my name to this specification in the presence of two subscribing witnesses.

JOHN FEDDERMAN.

Witnesses:
 EDWD. W. BYRN,
 L. G. ONDORFF.